UNITED STATES PATENT OFFICE.

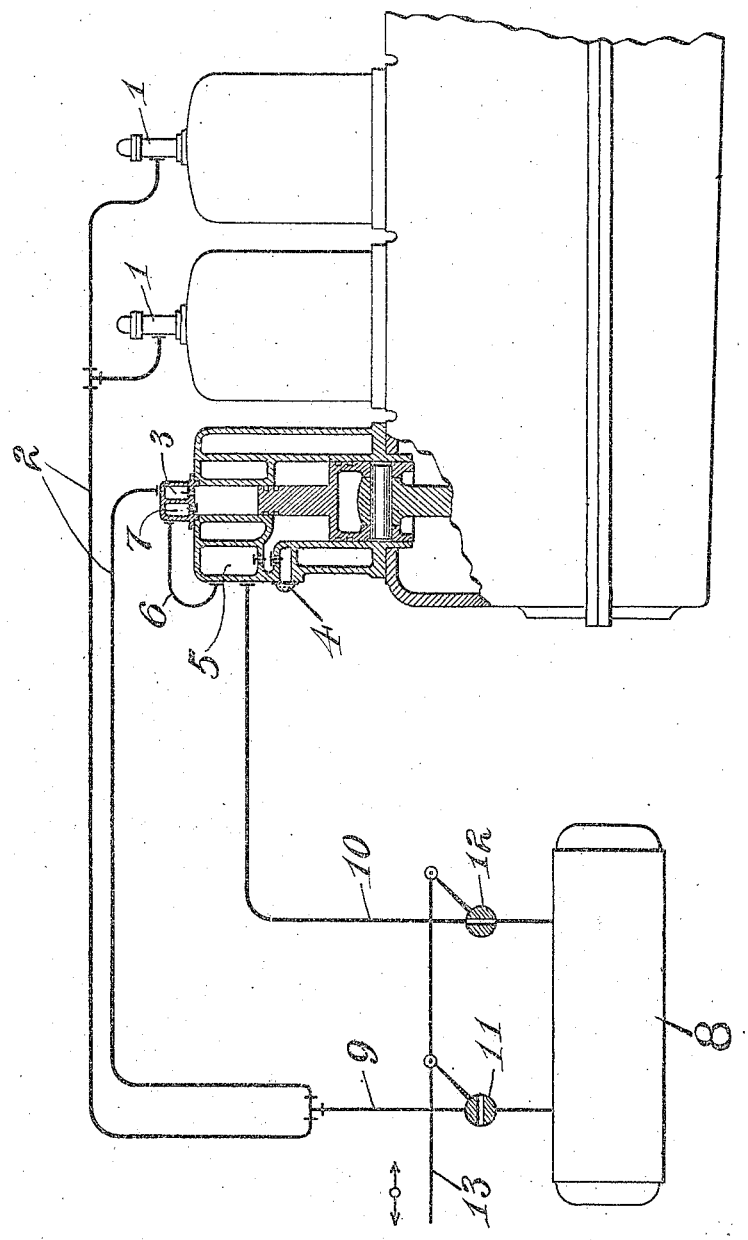

SAMUEL KILCHENMANN, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

FUEL-INJECTION SYSTEM.

1,320,764.  Specification of Letters Patent.  Patented Nov. 4, 1919.

Application filed February 12, 1919. Serial No. 276,593.

*To all whom it may concern:*

Be it known that I, SAMUEL KILCHENMANN, engineer, a citizen of the Republic of Switzerland, residing at Winterthur, Switzerland, have invented the following-described Improvements in Fuel-Injection Systems.

The invention concerns apparatus for supplying high pressure air for liquid fuel injection in Diesel and other types of engines and consists in the organization of means as herein described and claimed whereby the air flask in the injection line, if depleted in pressure, can be replenished by the action of the engine without delay either to the starting of the engine or putting it under load when started and whereby also the work to be done by the compressor may be reduced during the starting period of the engine. Such air flasks are commonly interposed in or connected to the injection air line between the compressor and the injection or fuel valve, serving as accumulators therein, and they also normally afford a sufficient reserve pressure to take care of injection of the initial fuel charges when the engine is being started under normal conditions and while the compressor is building up. When, after the lapse of a considerable standby period such a flask, from leakage or otherwise, falls below the pressure necessary for injection it frequently happens that the engine cannot be started at all or until the pressure is in some way raised or restored, and independent compressor plants and other expedients are commonly resorted to in such emergency. The present invention eliminates this difficulty by providing a shut-off connection between the flask and the high pressure injection line and a special connection between the same and the regular air compressor of the engine which can be set or adjusted in such manner as to replenish the flask while the compressor delivers injection air of a sufficient pressure direct to the fuel valves. These connections are also in the preferred form, mechanically correlated so that they automatically function by the manipulation of a single member or handle.

The drawing is a diagrammatic illustration of the preferred arrangement of the connections.

Two cylinders of an internal combustion engine are shown with their fuel injection valves 1 connected by a pipe line 2 to the outlet valve chamber 3 of the high pressure stage of a multi-stage or a two-stage air compressor, the latter being indicated as driven from the engine crankshaft. The low pressure stage of the compressor takes air from the atmosphere through entrance 4 and delivers it through the interstage receiver 5 (usually water-cooled) and through the pipe 6 to the inlet valve 7 of the high pressure stage in the usual way. The air flask 8 is provided with one connection 9 to the high pressure line 2 and another, 10, to the said interstage receiver and the two connections are conjointly controlled by valve members indicated at 11 and 12 respectively which valve members are joined to work in unison by a connecting rod 13, the end of which may be regarded as an operating member or handle by means of which the valve means in both connections may be coincidently operated to open one and close the other. In the normal use of the engine, including occasional stopping and starting, the connection 9 is open and 10 is closed so that the flask serves its normal and customary function as accumulator and reservoir. That is to say, it is in open communication with the high pressure line, receiving air therefrom or delivering air thereto as the case may be, in accommodation to the ordinary fluctuations of the injection air. When so connected the flask functions quite the same as though it were connected in series relation with the pipe sections which connect the high pressure stage of the pump to the injection valves. In such use the full delivery of the low pressure stage of the compressor passes through the receiver 5 and pipe 6 to the high pressure stage. When however the flask has become depleted to a less pressure than is suitable for fuel injection the rod 13 is moved to the position indicated in the drawing which isolates the flask from the high pressure line and connects it to the compressor to receive air from the low pressure stage thereof; for example, from the receiver 5 from which source the flask is gradually restored until it may be again connected to the high pressure injection line. During recharging of the flask through the connection 10, air at sufficient pressure is also delivered from the receiver to the high pressure stage of the compressor and is sufficient to produce an adequate injection air pressure in the fuel valves. At the end of the recharging operation, as indicated by pressure gages, placed where needed but not shown in the drawing, the rod 13 is slowly moved in the direction to open the valve 11 and thereby equalize the pressures in the pipe 2 and in the flask, whereupon the engine will proceed under fully normal conditions.

It will be observed that inasmuch as there is little or no load on the engine when being started, a correspondingly small amount of fuel is required for injection and a correspondingly small volume, or low pressure, of air is requisite for the purpose. Therefore, when the valves 11 and 12 are set as indicated in the diagram and some air is diverted through 10 to the air flask the corresponding diminishment of high pressure delivery coincides more or less exactly with the engine requirements. This represents an economy of energy for if the full volume should be delivered to the fuel valves on such occasions it would be without any benefit to the operation. As the pressure in the air flask rises, the high pressure air will also tend to increase in pressure, for obvious reasons, so that by the closure of valve 12 and opening of valve 11 a gradual transition to the normal condition can be readily accomplished, the air flask being thus restored to normal pressure without special means to that end and without interference with the operation of the power plant as a whole.

The mechanical designer will readily produce the connections and controls as above explained, in compact mechanical form involving the minimum pipe connections and adapted to be installed with the engine equipment without complication.

Claims:

1. In a fuel injection air system for internal combustion engines, the combination with the engine compressor and the injection air line leading to a fuel valve and connected to an air flask, or valved connections arranged for isolating the flask from the fuel valve and connecting the same to the compressor to be independently charged thereby.

2. In a fuel injection air system, the combination of a multi-stage engine compressor, an injection air line connecting the high pressure stage thereof to a fuel valve and also to an air flask and means for isolating the flask from the fuel valve and connecting the same to the compressor between the stages thereof.

3. In a fuel injection air system, the combination of an air flask having connections to an injection air line and to an engine compressor to be charged thereby and valve means in each connection adapted for coincidently and alternately opening one connection and closing the other.

In testimony whereof, I have signed this specification.

SAMUEL KILCHENMANN.